Nov. 4, 1924.
A. L. PUTNAM
DISK WHEEL
Filed June 9, 1919
1,513,859
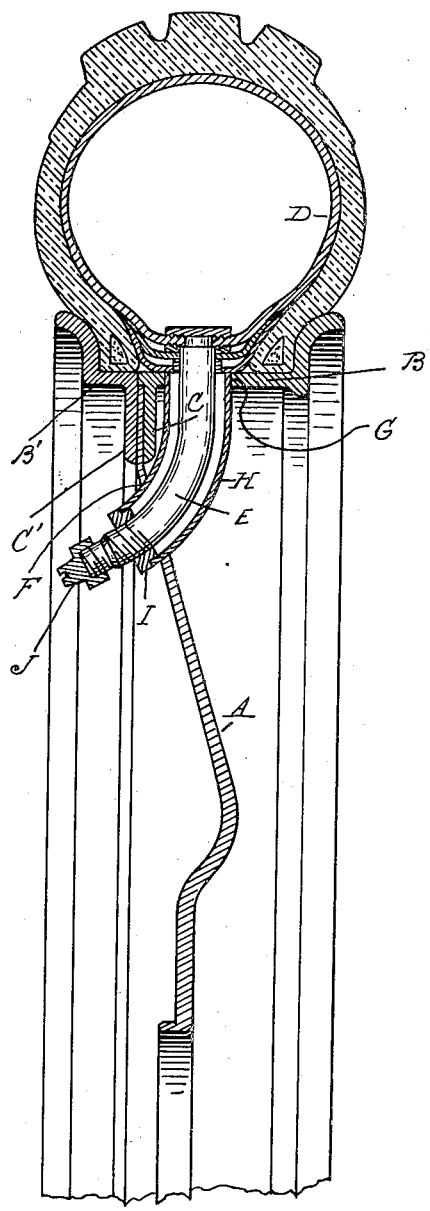
Inventor
Alden L. Putnam
By Whittemore Hulbert + Whittemore
Attorneys Patented Nov. 4, 1924.

1,513,859

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

DISK WHEEL.

Application filed June 9, 1919. Serial No. 302,645.

*To all whom it may concern:*

Be it known that I, ALDEN L. PUTNAM, a citizen of the United States of America, residing at Detroit, in the county of Wayne and State of Michigan, have invented certain new and useful Improvements in Disk Wheels, of which the following is a specification, reference being had therein to the accompanying drawings.

The invention relates to disk wheels designed for use in connection with pneumatic tires and of the type in which the junction between the periphery of the disk and the tire supporting rim is outside of the central plane or plane of impact of the wheel. With such wheels difficulty has been experienced in inflating the tires due to the fact that the tire inflation tube extends through an aperture in the center of the rim and is therefore arranged inside of the disk. Thus in inflating the tire it is difficult to attach the hose to the inflation tube, and with some constructions of vehicles it is impossible to do so without first removing the wheel.

It is the object of the present invention to provide a wheel of this type with means for locating the inflation tube where it is accessible from the front of the wheel and without in any way injuring this inflation tube or rendering it more difficult to remove the tire. To this end the invention consists in the construction as hereinafter set forth.

In the drawing I have shown a cross-section through a portion of a wheel constructed in accordance with my invention.

A is the dished disk of the vehicle wheel which is arranged with the peripheral portion of the disk to the outside of the central plane or plane of impact of the wheel. B and B' are complementary rim sections having inwardly extending flanges C and C' clamped upon opposite sides of the disk. D is the pneumatic tire and E is a standard construction of inflation tube upon said tire.

My improvement consists in providing the disk A with an aperture F near the periphery thereof which is in the radial plane of an aperture G through the rim section B. Between these apertures G and F there is also arranged a guide which, when the tire inflation tube is inserted through the outer aperture, will force the same through the inner aperture and with its end projecting to the front. This guide is preferably a curved tube H which is secured to the rim and extends downward obliquely through the aperture F in the disk. The guide tube is of greater diameter than the inflation tube so as to provide sufficient clearance for the passage of the latter, and a nut or annular cap I may be secured to the threaded portion of the tube E and engaged with the outer end of the tube H.

In use the tires may be mounted and demounted as readily with this construction as with the usual construction of wheel and the cap J and tube E are always in front of the disk in position for access.

What I claim as my invention is:—

1. The combination of a disk wheel having its peripheral portion in front of the central plane of impact of the wheel and provided with an aperture near the periphery thereof, a rim mounted on said disk having an aperture in the central plane thereof for the tire inflation tube, and guiding means for the inflation tube from said central aperture to the aperture in the disk.

2. The combination with a disk wheel having its peripheral portion in front of the central plane of the wheel and provided with an aperture therein near the periphery, of a rim mounted on said disk having an aperture in the central plane thereof for the tire inflation tube, and a tubular guide extending from the latter aperture through the former aperture.

In testimony whereof I affix my signature.

ALDEN L. PUTNAM.